United States Patent
Bauer et al.

(10) Patent No.: US 6,219,605 B1
(45) Date of Patent: Apr. 17, 2001

(54) AIR BAG SYSTEM WITH VARIABLE ACTIVATION TIME POINT

(75) Inventors: Hermann Bauer, Heidenheim; Richard Bender, Lauf; Franz Fürst, Grossmehring, all of (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 09/077,959
(22) PCT Filed: Dec. 5, 1996
(86) PCT No.: PCT/EP96/05430
  § 371 Date: Jun. 11, 1998
  § 102(e) Date: Jun. 11, 1998
(87) PCT Pub. No.: WO97/21566
  PCT Pub. Date: Jun. 19, 1997

(30) Foreign Application Priority Data

Dec. 12, 1995 (DE) ............................................. 195 46 297

(51) Int. Cl.[7] ............................. B60R 21/32; B60R 21/08
(52) U.S. Cl. ............................. 701/45; 280/732; 180/268
(58) Field of Search .................................. 701/45, 46, 47; 280/734, 735, 732, 752, 730.1, 731, 739; 307/10.1; 180/268, 271, 282

(56) References Cited

U.S. PATENT DOCUMENTS

| | | | |
|---|---|---|---|
| 5,074,583 | * 12/1991 | Fujita et al. | 280/735 |
| 5,122,954 | * 6/1992 | Okano | 364/424.05 |
| 5,158,323 | * 10/1992 | Yamamoto et al. | 280/734 |
| 5,209,510 | * 5/1993 | Mamiya | 280/732 |
| 5,330,226 | 7/1994 | Gentry et al. | 280/735 |
| 5,413,378 | * 5/1995 | Steffens, Jr. et al. | 280/735 |
| 5,787,377 | * 7/1998 | Watanbe et al. | 701/45 |

FOREIGN PATENT DOCUMENTS

| | | |
|---|---|---|
| 4341500 | 6/1994 | (DE) . |
| 9403455 | 10/1994 | (WO) . |

* cited by examiner

*Primary Examiner*—Tan Nguyen
*Assistant Examiner*—Dalena Tran
(74) *Attorney, Agent, or Firm*—Tarolli, Sundheim, Covell, Tummino & Szabo, L.L.P.

(57) ABSTRACT

In a method and an air bag system for depleting the kinetic energy of a vehicle occupant in case of a vehicle accident involving heavy, negative acceleration, the air bag system comprising a control unit for inflating an air bag which activates the air bag system on the basis of electric signals of an acceleration sensor provided in the vehicle, further sensor elements are provided by means of which the parameters determining the individual kinetic energy of the vehicle occupant are sensed and electrical signals representing these parameters are transmitted by the sensor elements to an electronic analyzer connected to the control unit, this electronic analyzer establishing on the basis of these signals a point in time $t_4$ at which the vehicle occupant is likely to come into contact with the inflated air bag of the air bag system, the electronic analyzer calculating on the basis of the established point in time $t_4$ a prior point in time $t_2$ at which the inflation of the air bag is to commence and signalling this to the control unit which at the point in time $t_2$ activates inflation of the air bag, thus enabling optimum protection of the vehicle occupant seated in front of the air bag to be assured and preventing injury thereby.

1 Claim, 2 Drawing Sheets

AIR BAG SYSTEM WITH VARIABLE ACTIVATION TIME POINT

Figure 1:
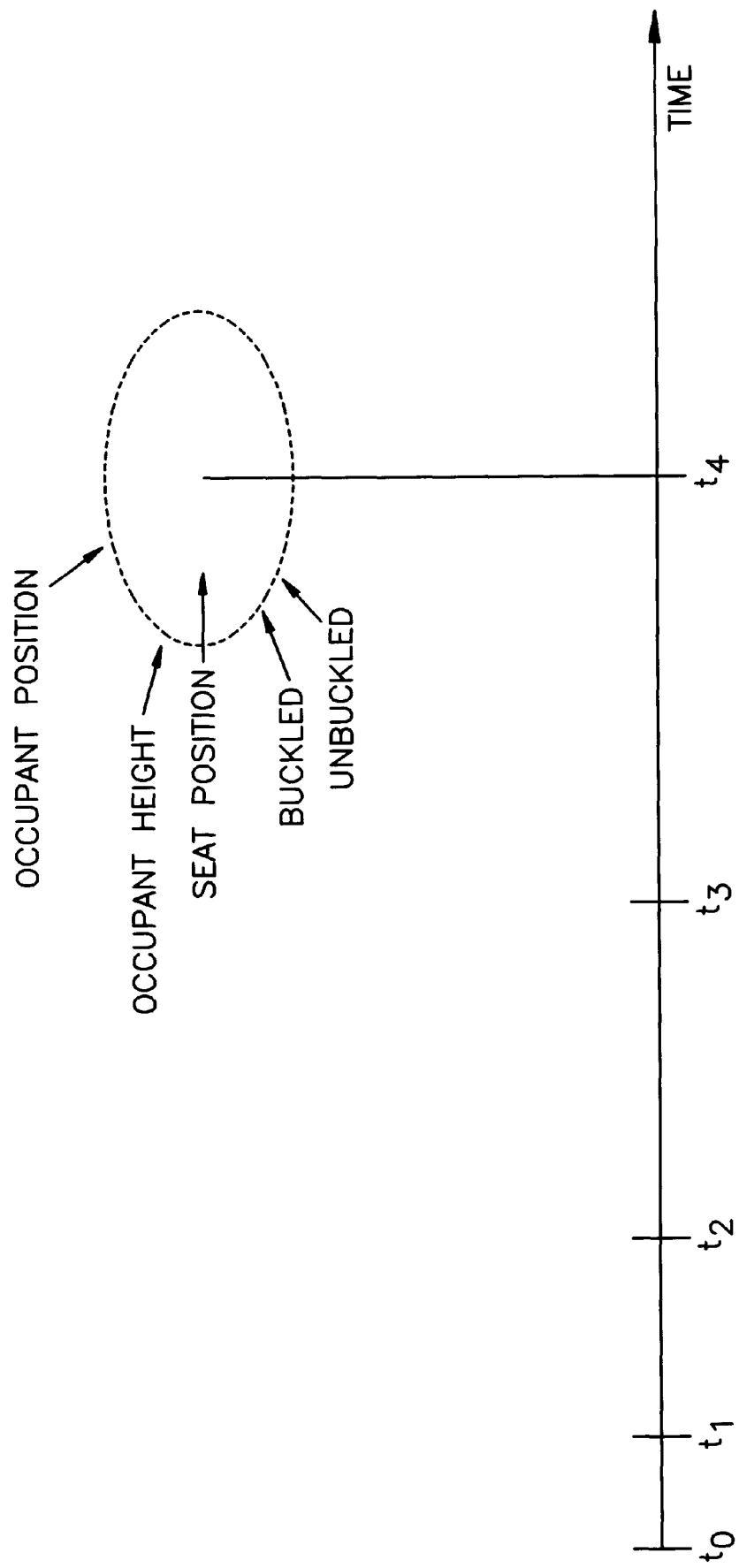

The invention relates to a method and an air bag system for depleting the kinetic energy of a vehicle occupant in case of a vehicle accident involving heavy, negative acceleration, the air bag system comprising a control unit for inflating an air bag which activates the air bag system on the basis of electric signals of an acceleration sensor provided in the vehicle.

One such method and air bag system is known from EP 0 449 506 A1.

Should the vehicle be involved in a crash situation, so-called air bag inflators generate gas for inflating an air bag which then protects the vehicle occupants from impact with rigid internal parts of the vehicle such as the steering wheel. The physics involved in this simply mean that the vehicle occupant accelerated by the vehicle collision is decelerated or intercepted by the relatively soft air bag, with a gas mass flowing through so-called vent holes from the air bag for this purpose. Accordingly, the air bag has the task of depleting the kinetic energy of the occupant as "softly" as possible over a short distance.

Current air bag concepts mostly make use of inflators of the pyrotechnic type. Pyrotechnic-type inflators function in general such that an igniter in the inflator is ignited by a current pulse produced by a sensor system recognizing a vehicle crash situation. This ignition is boosted by a so-called booster charge generating hot particles which then impinge the surface of the gas generant mostly provided in the form of pellets which then automatically ignites and deflagrates in the so-called combustion chamber under a high pressure, thereby producing the gas for inflating the air bag. Since, in addition to a pure gas, fluid or solid constituents materialize during combustion, the gas flow is cleaned by corresponding filters in the filter chamber before emerging from the inflator.

The important thing in this respect is always ensuring complete combustion so that always the same amount of gas is generated once combustion of the gas generant has been initiated. Furthermore, the temperature of the generated gas is substantially influenced only by the ambient temperature existing on ignition of the gas generant, i.e. quite simply the cushioning performance provided by the air bag system is mainly influenced by the ambient temperature.

The air bag system known from EP 0 449 506 A1 comprises a two-stage inflator device for inflating the air bag. The two-stage configuration of the inflator device results in the air bag being initially slowly inflated in part in a first stage before being fully inflated as quickly as possible in a second stage. Between the first stage and the second stage of inflation a time delay is provided, designed to permit a more gentle cushioning of the vehicle occupant by the air bag. The known air bag is, nevertheless, totally inflated and with a high internal pressure so that it cannot be excluded that the vehicle occupant seated in front of the air bag is injured by the severe impact with the air bag.

In the case of the air bag system according to the teaching of EP 0 455 435 A2 the gas initially flows slowly into the air bag, and then fully inflates the air bag with maximum inflow velocity. This is also why no adaptation of the inflated air bag to the vehicle occupant seated in front of the air bag can be achieved by this two-stage configured air bag system, as a result of which with this air bag system too, injuries of the vehicle occupant seated in front of the air bag cannot be totally excluded, especially in the case of children.

Known from U.S. Pat. No. 5,219,178 is a further air bag system in which the gas produced for inflating the air bag is generated in two different chambers and in succession, as a result of which it can be achieved that as compared to prior art a greater amount of gas can be generated for inflating the air bag. Due to the two-stage inflator device the air bag is nevertheless always inflated to the same degree of hardness. Thus, in the case of this known air bag system too, a smaller and lighter vehicle occupant, for example a child, seated in front of the air bag may suffer injuries.

The present invention is thus based on the object of sophisticating the known method and air bag system such that, on the one hand optimum protection of the vehicle occupant seated in front of the air bag is assured and, on the other, injury of the vehicle occupant is avoided as far as possible.

This object is achieved by a method and an air bag system in which further sensor elements are provided by means of which such parameters are sensed which determine the individual kinetic energy of the vehicle occupant, and electrical signals representing these parameters are transmitted by the sensor elements to an electronic analyzer connected to the control unit, this electronic analyzer calculating on the basis of these signals a point in time $t_4$ at which the vehicle occupant is likely to come into contact with the inflated air bag of the air bag system, the electronic analyzer calculating on the basis of the established point in time $t_4$ a prior point in time $t_2$ at which the inflation of the air bag is to commence and which point in time $t_2$ is signalled to the control unit which activates inflation of the air bag at the point in time $t_2$.

A very good characterization of the vehicle occupant seated in front of the air bag can be achieved by the sensor elements for the electronic control, so that optimum protection of the vehicle occupant is assured by the point in time of activation of the air bag system being matched to the vehicle occupant seated in front of the air bag and to the current circumstances of the crash situation. The air bag system is controllable by the method in accordance with the invention such that the necessary soft cushioning effect is always achieved for the vehicle occupant.

A further substantial advantage of the solution in accordance with the invention is that due to the point in time $t_2$ being established individually, the same components of the sensor system and inflators of the air bag system can also be put to use in totally different vehicles without it being necessary to adapt the hardware.

Especially preferred is a variant of the method in accordance with the invention, in which the electronic analyzer calculates on the basis of the signals from the sensors also a point in time $t_3$ located between the points in time $t_2$ and $t_4$, at which point in time $t_3$ inflation of the air bag is to be completed and which is signalled to the control unit, the control unit then controlling the inflation process of the air bag such that the air bag is fully inflated at the point in time $t_3$.

In one preferred embodiment of this variant of the method it is provided for that the ambient temperature of the air bag system is sensed by sensor elements and that the electronic analyzer establishes therefrom the likely degree of airbag inflation on completion of inflation and takes it into account in calculating the optimum point in time $t_3$.

Preferably, use is made of control signals from the sensor elements for controlling ignition processes and/or starting a gas generating reaction. Gas generation may also occur intermittently, for example, by using a multi-stage inflator and thus can be configured variably to a major extent. As a result of this, differing degrees of airbag inflation can be produced and the cushioning effect can thus be adapted with the aid of the sensor elements to the kinetic energy of the vehicle occupant seated in front of the air bag.

Furthermore, the time profile of gas generation may be varied over a broad range by corresponding control signals,. this likewise contributing towards adjusting the cushioning effect optimally to the kinetic energy of the vehicle occupant.

The control unit regulates the amount of gas, the rate and pressure of inflation and adapts these variables determining the inflation response of the air bag specifically to the vehicle occupant characterized by the sensed parameters.

Particularly preferred also is a variant of the method in which calculation of the optimum point in time $t_2$ and, where necessary, also of the optimum point in time $t_3$ in the electronic analyzer may be done on the basis of characteristic diagrams specific to the vehicle concerned and entered previously, in which diagrams, for each individually occurring constellation of the parameters sensed by the sensors, the points in time $t_2$ and, where necessary, also $t_3$ suitable to the respective type of vehicle concerned are stored, for achieving an optimum protection for the vehicle occupant. In this way the computation effort involved in calculating the optimum point in time $t_2$ and/or $t_3$ and thus the reaction time of the system can be minimized. In addition, by entering characteristic diagrams specific to the vehicle concerned, adapting the software of a standard air bag system to any type of vehicle is rendered particularly simple.

Also of advantage is a variant of the system in which by means of a proximity sensor system and/or by analyzing the vehicle speed permanently a probable relative impact velocity of the vehicle with an outer object is calculated, and in which the analysis algorithm to be used in the electronic analyzer is preset on the basis of this relative impact velocity. Thus, the calculating time of the electronic analyzer and consequently the reaction time of the system as regards an optimum soft cushioning effect can be even further reduced.

Since the kinetic energy of the vehicle occupant to be intercepted depends mainly on the weight of the vehicle occupant concerned, it is particularly preferred that in the method in accordance with the invention the weight of the vehicle occupant seated in front of and/or beside the corresponding air bag is sensed by sensor elements.

In yet a further embodiment the seating position of the vehicle occupant seated in front of and/or beside the corresponding air bag is sensed by sensor elements. Sensing the seating position contributes towards further optimizing the method since it can be sensed whether the vehicle occupant is seated, for example, on the front edge of the vehicle seat or leaning forward or backwards on the vehicle seat or whether the seat back has been hinged back. Sensing these parameters may be achieved for example by pressure sensors incorporated in the upholstery of the seat.

In another embodiment the sensor elements sense whether the seat belt has been buckled up by the vehicle occupant seated in front of and/or beside the corresponding air bag. From this information the control unit is able to inflate the air bag such that the safety of the vehicle occupant is assured and compensated at least in part by the air bag despite the case of the seat belt not being buckled up.

When the position of the seat of the vehicle occupant seated in front of and/or beside the corresponding air bag is sensed by the sensor elements, the size of the air bag can be adjusted specifically to the distance at which the vehicle occupant is seated in front of the air bag.

In yet another embodiment the head level of the vehicle occupant seated in front of and/or beside the corresponding air bag is sensed by the sensor elements. Sensing the head level could be implemented, for example, by sensors configured in the headrest as pressure sensors. It would be just as feasible to employ more precise instrumentation for this purpose, such as laser or light barriers.

In the likewise preferred embodiment the likely impact position and impact velocity with which the head of the vehicle occupant seated in front of the corresponding air bag impinges the air bag is calculated after having sensed the parameters determining the individual kinetic energy of the vehicle occupant. The sensor elements monitor and survey the vehicle occupant seated in front of the air bag as regards his body position, so that it can be achieved that the head always impinges the point of the air bag optimum for protection when the vehicle is involved in an accident.

Covered by the scope of the present invention is also an air bag system comprising further sensor elements which are capable of sensing such parameters which determine the individual kinetic energy of the vehicle occupant, and that electrical signals representing these parameters are transmitted by the further sensor elements to an electronic analyzer connected to the control unit, this electronic analyzer calculating on the basis of these signals a point in time $t_4$ at which the vehicle occupant is likely to come into contact with the inflated air bag of the air bag system, the electronic analyzer being able of calculating on the basis of the calculated point in time $t_4$ a prior point in time $t_2$ at which inflation of the air bag is to commence and being able of signal it to the control unit for activating the inflation response.

The air bag system in accordance with the invention is provided with sensor elements by means of which the vehicle occupant seated in front of the air bag can be characterized very well as regards his/her kinetic energy so that optimum protection for the vehicle occupant is assured by the output of the air bag system being adapted to the vehicle occupant seated in front of the air bag.

The sensor elements serve to an advantageous sensing of the aforementioned parameters. In this arrangement the control unit is configured such that the likely impact position and impact velocity of the head of the vehicle occupant seated in front of the air bag can be calculated after having sensed the parameters determining the individual kinetic energy of the vehicle occupant. A vehicle occupant seated in front of the air bag receives individual protection against the consequences of the vehicle being involved in an accident, i.e. against impacting the vehicle interior.

Further advantages of the invention read from the description and the drawing. It will also be appreciated that the features as cited above and to be subsequently disclosed may find application either individually or in any combination thereof. Accordingly, the embodiments as illustrated and described are not to be understood as constituting a limiting account, they instead having the character of examples assisting in describing the invention. In the drawings FIG. 1 is a general time diagram for the inflation process of an air bag system; and FIG. 2 is a schematic travel/time diagram of various vehicle occupants as regards their air bag distance, in a vehicle crash situation.

Figure 2:
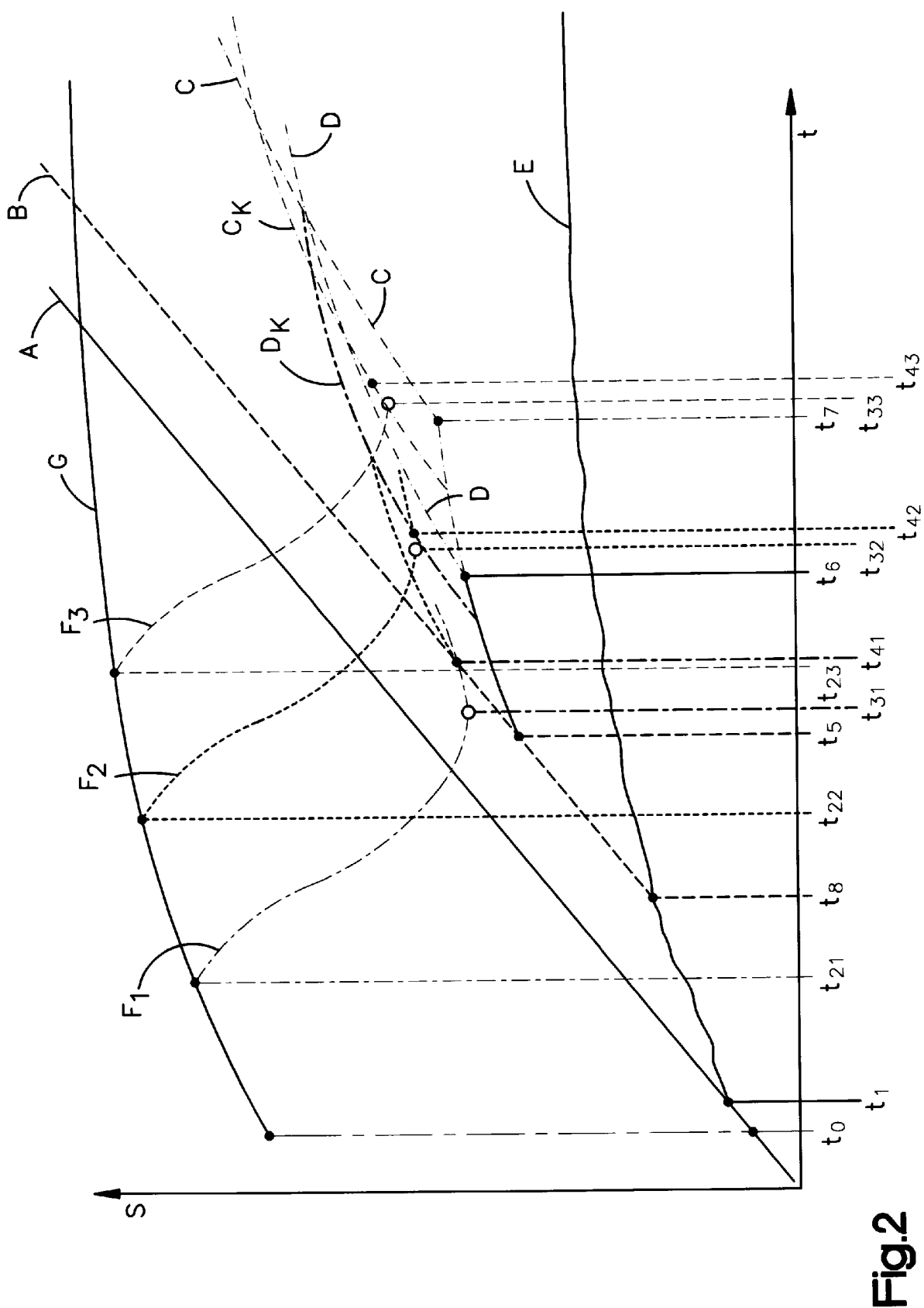

The time sequence for activating air bag inflators can be illustrated graphically as shown in FIG. 1, whereby $t_0$=commencement of vehicle crash $t_1$=point in time of the activating sensor system recognizing the crash impulse for the first time $t_2$=point in time of the activating sensor system activating the air bag inflators $t_3$=point in time of air bag having been inflated by the inflator
(air bag actively providing protection)

$t_4$=point in time of vehicle occupant coming into contact with the air bag wherein it is defined:

$t_0-t_1=\Delta t_{vehicle}$ $t_2-t_1=\Delta t_{sensor\ system}$ $t_3-t_2=\Delta t_{inflator}$ $t_4-t_3=\Delta t_{occupant}$ $t_4-t_3=\Delta t_{delay}$ The time space $\Delta t_{vehicle}$ is influenced by the stiffness and construction of the vehicle structure and is substantially very short (approx. 2ms). The time space $\Delta t_{sensor\ system}$ is determined substantially by the nature of the crash and the velocity of impact and varies in the range of approx. 5–70 ms. The time space $\Delta t_{inflator}$ and the degree of airbag inflation substantially depend on the ambient temperature, they varying, according to the design, from approx. 25 to 40 ms for the driver's side and from approx. 40 to 60 ms for the front passenger side.

By contrast, the time space $\Delta t_{occupant}$ depends on many parameters such as impact velocity and direction thereof, absorption capacity of the vehicle structure, occupant height, occupant position, buckled up/non-buckled up, but, for example, is irrespective of ambient temperature.

Prior art air bag systems are designed such that substantially the time spaces $\Delta t_{sensor\ system}$ and $\Delta t_{inflator}$ are defined such that in as many cases of application as possible a sufficient but not always optimum protection effect is achieved, i.e. for identical parameter constellations of the air bag system (type of crash, vehicle speed, ambient temperature) the air bag system always functions the same irrespective of the parameters relevant to the occupant (occupant height, occupant weight, seating position, buckled up/non-buckled up). In the reverse case, for same values of the parameters relative to the occupant, the air bag system should always have to function the same which, however, is not the case at differing ambient temperatures.

Accordingly it is a disadvantage with known air bag systems that, although the points in time $t_3$ are substantially determined for variable crash types, the individual situation of the occupant to be protected is not taken into account. In addition, the components sensor system and inflators as regards their time spaces need to be adapted to the various vehicles concerned.

Referring now to FIG. 2 there is illustrated a schematic travel/time diagram depicting somewhat more precisely the movement sequence of vehicle occupants relative to the air bag. The curve (A) indicates a uniform vehicle movement without collision whilst the curves (E) and (G) drawn parallel to each other describe the movement of the colliding vehicle and the steering wheel accommodating the air bag. Should a vehicle crash commence at a point in time $t_0$, a vehicle occupant non-buckled up would be catapulted from the curve (E), i.e. the vehicle seat, at the point in time $t_8$ due to his/her mass inertia and continue on a curve (B). The curve (C) represents the movement of a heavy vehicle occupant buckled up in a belt system without tensioner, curve (D) that of a correspondingly lighter vehicle occupant. The curves ($F_1$), ($F_2$) and ($F_3$), finally, characterize the relative movement of the air bag towards the occupant in its time sequence, for differing points in time of activation $t_{21}$, $t_{22}$ and $t_{23}$ of the inflator.

At the point in time $t_5$ the curves (C) and (D) of buckled up persons depart from the curve (B) of a non-buckled up vehicle occupant since these fall into the belt at this point in time $t_5$. This is followed by the stretching phase of the belt up to a later point in time $t_6$ at which the stretching phase for the light person is terminated, the common curve splitting into the curves (C) for a heavier person and (D) for a lighter person, since the heavier person effects a longer stretch of the belt due to his greater kinetic energy and thus the stretching phase thereof is not terminated until the point in time $t_7$. Since shortly before the point in time $t_6$ or $t_7$ is attained, the head of the lighter and the heavier person, respectively, is catapulted forwards, a further curve ($D_K$) and ($C_K$), respectively, splits up, describing the movement sequence of the head concerned.

The movement sequence of a heavy person will now be described by way of the curve (C) in conjunction with deployment of the air bag and an inflator activated at the point in time $t_{23}$ as depicted by curve ($F_3$), it being assumed that at the point in time $t_{33}$ the inflator has fully inflated the air bag, i.e. it having attained its optimum protection effect. At the point in time $t_{43}$ the head of the heavy person, moving as described by the curve ($C_K$) impinges the fully inflated air bag which then cushions this person without causing any injury.

For a lightweight or non-buckled up vehicle occupant the situation is different when the air bag is activated likewise in accordance with the curve ($F_3$) at the point in time $t_{23}$.

The curves (B) and ($F_3$) intersect at a point in time at which the air bag has, by far, still to attain its full cushioning volume for the non-buckled up vehicle occupant, but the non-buckled up vehicle occupant already contacts the air bag at this point in time. It is obvious that the cushioning effect in this case is not at all an optimum.

At a later point in time the lightweight person moving as described by the curve (D) has head contact with the air bag as, described by the curve ($D_K$), the belt of this lightweight person already having been totally tensioned at the point in time $t_6$. Here too, it is obvious that this is not the optimum point in time for providing the full cushioning effect of the air bag, since it is not until a later point in time $t_{33}$ that the inflation process of the air bag has been fully concluded and the air bag is corresponding fully inflated.

From all of the above it is obvious that in the classic profile of an air bag deployment sequenced in keeping with a rigid time scheme it is only in seldom exceptional cases that optimum conditions exist for cushioning the impinging vehicle occupant. Normally, the air bag will be inflated for the individual situation either too early or too late, too hard or too soft.

The achievement in accordance with the invention couples the air bag relevant parameters to the vehicle occupant relevant parameters, by a delay time space $\Delta t_{delay}$ which is introduced into the system and actively controlled. This active control is achieved by sensors sensing the relevant occupant parameters such as height, weight, seating position, buckled up/non-buckled up, vehicle speed and air bag parameters such as ambient temperature, and presenting them to an electronic analyzer which is coupled to a control unit for activating the air bag.

The control unit thus outputs as a function of the sensed parameters an ignition signal for activating the inflator. In the case of a light person as described by curve (D) compared to a heavy person as described by curve (C) this results in an earlier point in time of activation $t_{22}$ of the airbag which then deploys as described by the curve ($F_2$). At the point in time $t_{32}$ the air bag has completed its inflation process and developed its full protection effect at the point in time $t_{42}$ when the head of the vehicle occupant impinges the air bag as described by the curve ($D_K$).

In the case of a non-buckled up vehicle occupant (cf. curve (B)) the control unit causes a further advancement of the point in time of ignition of the inflator to the point in time $t_{21}$, this being the reason why the air bag has already been fully inflated at an earlier point in time, namely at the point in time $t_{31}$. Therefore, at the point of impingement of the vehicle occupant with the air bag the full protection effect is likewise available at the point in time $t_{41}$.

In the scope of adapting the air bag in the development phase a characteristic diagram for the individual parameters and their combinations can be worked out from which the delay time space $\Delta t_{delay}$ is evident, for achieving an optimum protection effect. It is in the case of the air bag being activated that this delay time space prior to activation of the air bags comes into effect following analysis of the delay signal and the decision that the air bags are to be activated. Here, technical realization of this delay time space can be done both by hard- and software means.

These characteristic diagrams now make it possible for the first time in the broadest sense to employ the sensor system as well as the inflators with no changes thereto in different types of vehicles, since data specific to the vehicle concerned can be represented by the diagrams. This results in a greater cost effectiveness for the components sensor system and inflator.

It is just as possible in a crash situation to match the protection function of the air bag system optimally to the occupant to be protected.

It is to advantage that this achievement also offers the possibility of introducing so-called alert functions in the air bag activation system. For example, by introducing a proximity sensor system and/or means of analyzing the vehicle speed, presetting the analysis algorithm can already be undertaken which, for example, would result in shorter activation times. Further combinations such as non-activation in the case of minor vehicle impact or in the case of the occupant being out of position are conceivable.

A further advantage is to be seen in the combination of the achievement in accordance with the invention with so-called multi-stage inflators with which both the inflation time and degree of airbag inflation can be varied within specific limits. For example, by means of a variable time offset of the two stages of a two-stage inflator, the protection for the occupant can be even better adapted to the individual occupant situation.

What is claimed is:

1. A method for depleting the kinetic energy of a vehicle occupant in case of a vehicle accident involving heavy, negative acceleration by means of inflating an air bag in an air bag system, a control unit activating the air bag system on the basis of electric signals of an acceleration sensor provided in the vehicle, characterized in that further sensor elements are provided in the vehicle by means of which such parameters are sensed which determine the individual kinetic energy of the vehicle occupant, and that electrical signals representing these parameters are transmitted by the sensor elements to an electronic analyzer connected to the control unit, said electric analyzer calculating on the basis of these signals a point in time $t_4$ ($t_{41}$, $t_{42}$, $t_{43}$) at which the vehicle occupant is likely to come into contact with the inflated air bag of the air bag system, and in that said electronic analyzer calculates on the basis of said established point in time $t_4$ ($t_{41}$, $t_{42}$, $t_{43}$) a prior point in time $t_2$ ($t_{21}$, $t_{22}$, $t_{23}$) at which the inflation of the air bag is to commence and signals this to the control unit which at said point in time $t_2$ ($t_{21}$, $t_{22}$, $t_{23}$) activates inflation of the air bag, that said electronic analyzer calculates on the basis of said signals from said sensors also a point in time $t_3$ ($t_{31}$, $t_{32}$, $t_{33}$) located between said points in time $t_2$ ($t_{21}$, $t_{22}$, $t_{23}$) and $t_4$ ($t_{41}$, $t_{42}$, $t_{43}$), at which point in time $t_3$ inflation of said air bag is to be completed and which is passed on to said control unit, said control unit controlling the inflation process of said air bag such that said air bag is fully inflated at said point in time $t_3$ ($t_{31}$, $t_{32}$, $t_{33}$), characterized in that calculating said optimum point in time $t_2$ ($t_{21}$, $t_{22}$, $t_{23}$) and where necessary also said optimum point in time $t_3$ ($t_{31}$, $t_{32}$, $t_{33}$) in said electronic analyzer is done on the basis of characteristic diagrams specific to the vehicle concerned and entered previously, in which diagrams, for each individually occurring constellation of said parameters sensed by said sensors, the points in time $t_2$ ($t_{21}$, $t_{22}$, $t_{23}$) and where necessary also $t_3$ ($t_{31}$, $t_{32}$, $t_{33}$) suitable to the respective type of vehicle are stored, for achieving an optimum protection for said vehicle occupant.

* * * * *